June 20, 1939.  E. E. TISZA ET AL  2,163,418

DIRECT-CURRENT ARC WELDING GENERATOR

Filed Nov. 25, 1938    3 Sheets-Sheet 1

OPEN-CIRCUIT AND
INITIAL LOAD CONDITIONS

NORMAL LOAD AND
SHORT-CIRCUIT CONDITIONS

INTERMEDIATE MOMENTARY
CONDITIONS

INVENTORS
Ernest E. Tisza
and Joseph Tyrner
BY
Williams, Rich & Morse
ATTORNEYS

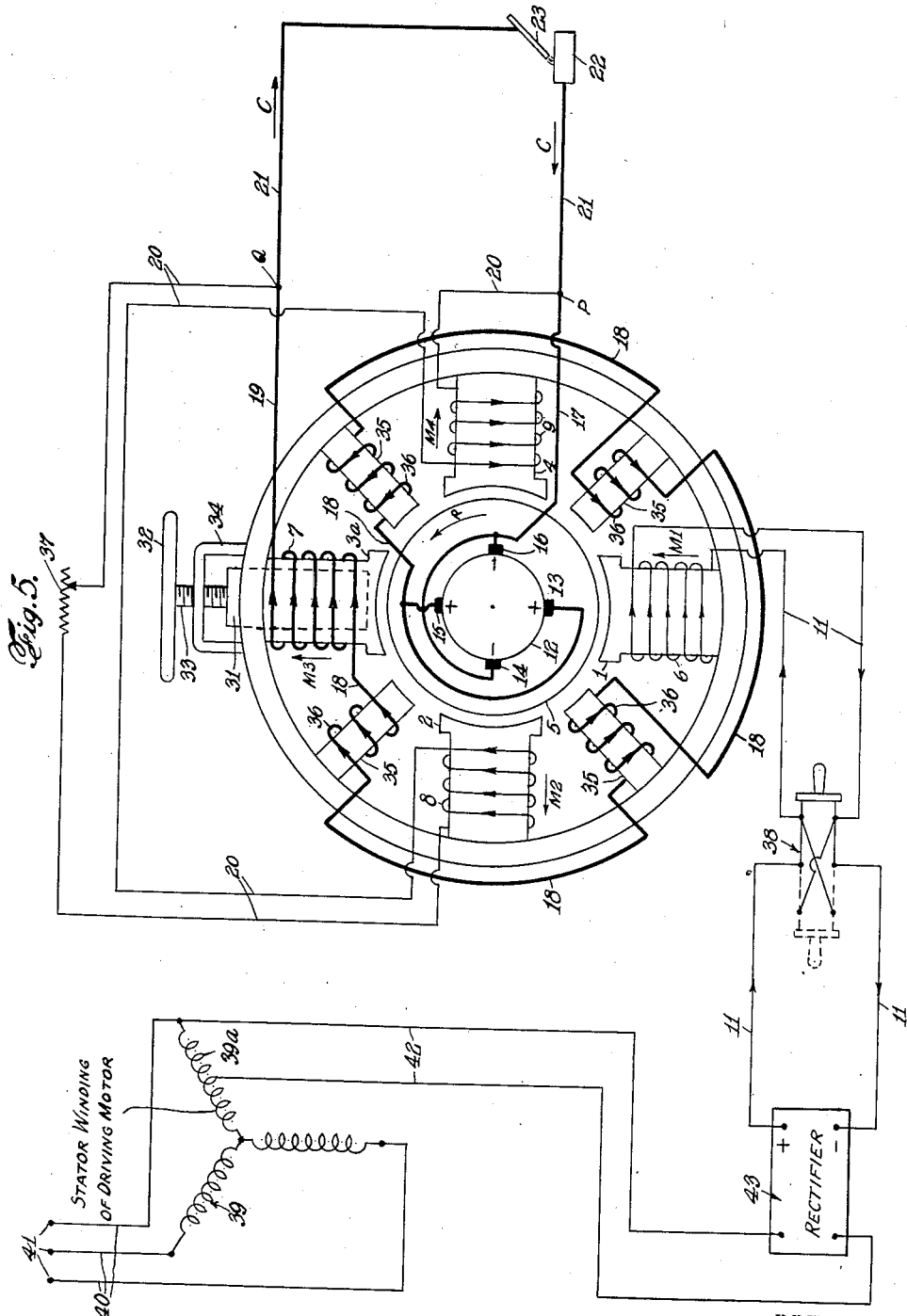

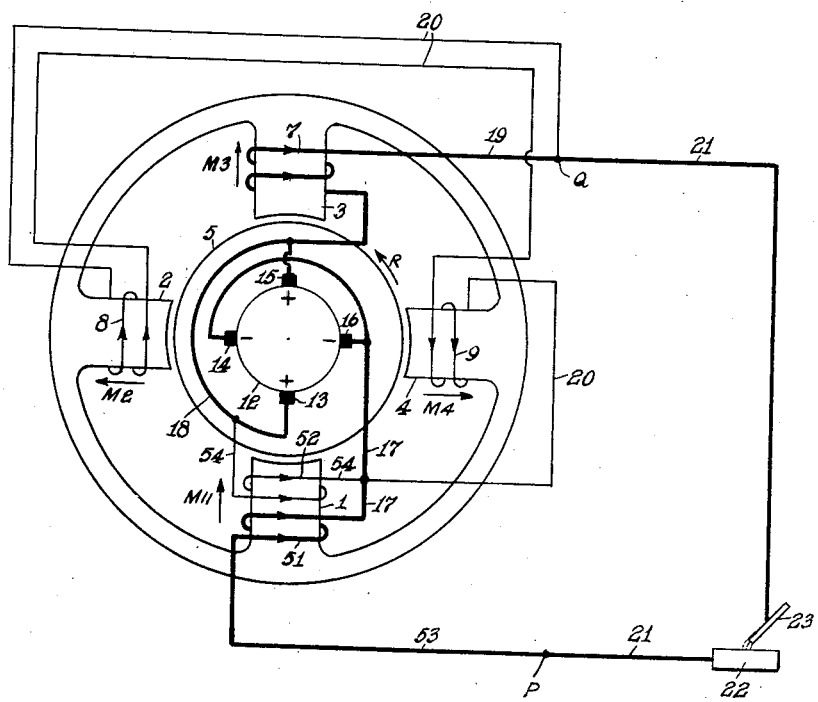

Patented June 20, 1939

2,163,418

UNITED STATES PATENT OFFICE 2,163,418

DIRECT-CURRENT ARC WELDING GENERATOR

Ernest E. Tisza and Joseph Tyrner, Englewood, N. J., assignor to Air Reduction Company, Incorporated, New York, N. Y., a corporation of New York Application November 25, 1938, Serial No. 242,202

6 Claims. (Cl. 171—223)

The present invention relates to direct-current generators for arc welding employing a series field for self-regulation.

An important object of the invention is to provide a generator of this character having simple features of construction resulting in improved transient characteristics.

In accordance with the invention, this object is accomplished by making use of an ordinary four-pole field magnet frame with which is assocciated a special field winding arrangement, the four pole elements of such frame cooperating with an ordinary four-pole series-wound armature. On two oppositely disposed pole elements are respectively carried a constant-field winding and a series-field winding, while on each of the remaining two oppositely disposed pole elements is intermediately carried a shunt-field winding, these four windings being so connected that the two shunt-field windings assist the constant-field winding and oppose the series-field winding. As we have discovered, this simple four-pole generator construction operates in distinctive manner to provide the required terminal voltage variation for self-regulation. As a result of this peculiar operation, transient effects are effectively minimized.

Those skilled in the art, of course, will understand that a group of compound windings may be substituted for any one of the aforementioned four windings included in the field winding arrangement of the present invention, each replacing group having the same function as the single replaced winding of such arrangement.

Further objects of the invention will become apparent hereinafter.

Figure 1:
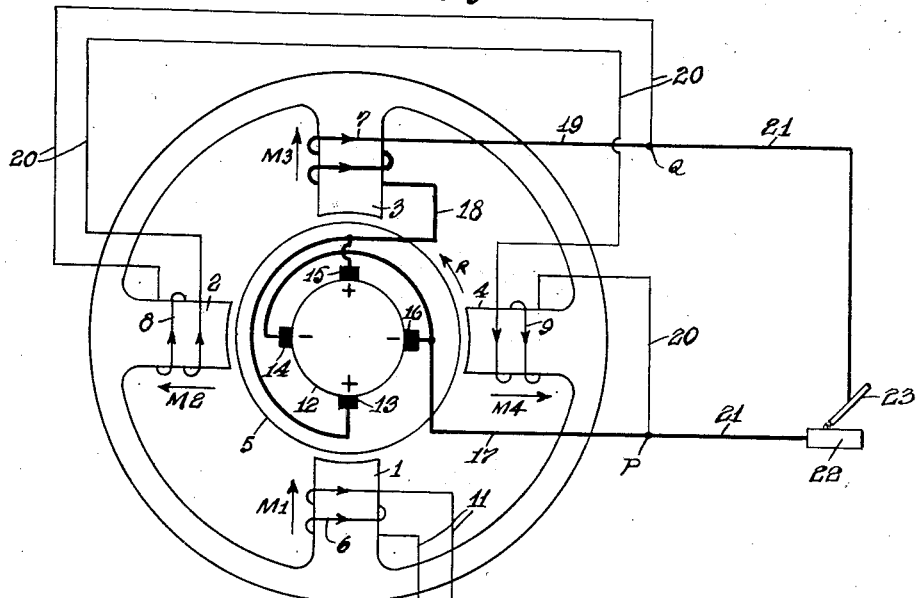
Figure 2:
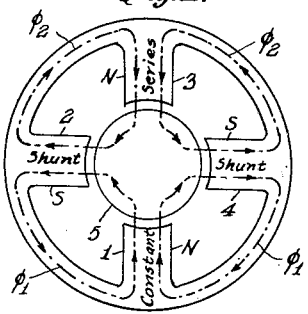
Figure 4:
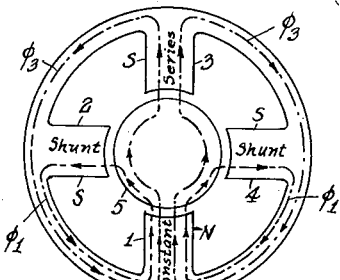
Figure 3:
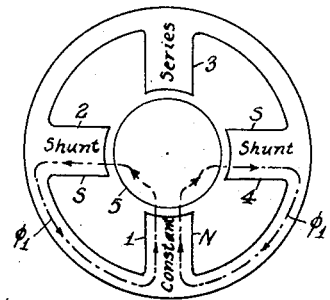

The invention will be understood from the following description taken in conjunction with the accompanying drawings in which Fig. 1 is a simplified view of a machine constructed according to the invention, all but the essential parts being omitted for clarity; Figs. 2 to 4 are sketches illustrating the field flux paths under various conditions ranging from open-circuit to short-circuit; Fig. 5 is a view of a more elaborate embodiment of the invention, this embodiment including a means for separately exciting the constant-field winding and a means for reversing the polarity of the machine; Fig. 6 is a simplified view of another machine constructed according to the invention, showing the possibility of entirely depending on the generator armature for excitation purposes; and Fig. 7 is a view showing characteristic curves of the type obtainable by the invention.

Similar characters refer to similar parts throughout the various figures.

Referring to Fig. 1, a welding generator is shown which comprises a field magnet frame of usual construction having four inwardly extending pole elements 1 to 4 equally spaced circumferentially about the armature 5. The field winding arrangement associated with these pole elements consists of a constant-field winding 6 disposed on the pole element 1, a series-field winding 7 disposed on the pole element 3, and two shunt-field windings 8 and 9 respectively disposed on the pole elements 2 and 4. It will be noted that the constant-field winding 6 and the series-field winding 7 operate on one pair of diametrically opposite pole elements on either side of the other pair of diametrically opposite pole elements carrying the two shunt-field windings 8 and 9. Also, it will be noted that the four windings 6 to 9 have terminal connections such that their magnetomotive forces are caused to be directed relatively to one another as shown by the arrows M1 to M4, under which condition the two shunt-field windings 8 and 9 will assist the constant-field winding 6 and oppose the series-field winding 7.

Any suitable constant potential source of current may be used to supply the exciting current to the constant-field winding 6, which is shown connected to the terminals 10 of such a source by conductors 11. Preferably, the pole element 1 carrying the constant-field winding 6 is operated at magnetic saturation.

The armature 5 has a four-pole series-type winding, i. e., a four-pole two-path wave winding, which being well known in the art is not shown in the drawings. Connected in the usual manner with this armature winding is a commutator 12 provided with four load brushes 13 to 16, the arrow R indicating the direction of armature rotation required to cause these brushes to have the polarities indicated. As shown, the two brushes 14 and 16 of negative polarity lead directly by a conductor 17 to one output terminal P of the generator, while the two brushes 13 and 15 of positive polarity lead by a conductor 18 to the series-field winding 7 and thence by a conductor 19 to the other output terminal Q of the generator, it being understood that the position of the series-field winding 7 in this series circuit of the armature with the output terminals P and Q is immaterial.

For the two shunt-field windings 8 and 9, long-shunt connections across both armature 5 and series-field winding 7 are preferred, but are in no sense essential to the invention. Also, it is immaterial whether these shunt-field windings 8 and 9 are connected in separate shunt circuits or in a single shunt circuit. As shown, conductors 20 connect the two shunt-field windings 8 and 9 in series with one another and with the output terminals P and Q, which connects them as a single long-shunt across both armature 5 and series-field winding 7.

In the usual manner the welding current is supplied from the output terminals P and Q, which are shown connected by conductors 21 to a work piece 22 and the welding electrode 23 thereon.

Taking the machine of Fig. 1 as an example, the distinctive manner in which the generator of the present invention operates will be fully described with the aid of Figs. 2 to 4 in which the four windings of Fig. 1 have been omitted for simplicity, each of the four pole elements being labelled in accordance with the type of winding which it carries. In each of Figs. 2 to 4, of course, the symbols N and S are used in the conventional manner to refer to north and south poles.

Fig. 2 has reference to conditions existing in the generator on open-circuit and under initial load, while Fig. 4 has reference to conditions existing in the generator under normal load and on short-circuit. Fig. 3 has reference to momentarily occurring conditions between initial and normal loads. As made clear by the symbols N and S in Figs. 2 and 4, the series pole 3 is the only one of the four poles to reverse in polarity with increase of current supplied from the generator, the polarities of the other three poles remaining unchanged. Consequently, there must be an instant during such increase of current when the series pole 3 is ineffective either as a north pole or as a south pole. Fig. 3 has reference to conditions existing in the generator at that particular moment.

The four field windings of Fig. 1 all experience magnetomotive variations except the constant-field winding 6, whose magnetomotive force is obviously constant from open-circuit to short-circuit. The magnetomotive force of the series-field winding 7 is zero on open-circuit, but continuously increases with increase of current supplied from the generator and finally reaches a maximum on short-circuit. On the other hand, the magnetomotive forces of the two shunt-field windings 8 and 9 are maximum on open-circuit, but continuously decrease with increase of current supplied from the generator and finally become substantially zero on short-circuit. These facts in regard to the magnetomotive forces of the four field windings of Fig. 1 should be borne in mind in reading the description following.

On open-circuit, no flux can be produced by the series-field winding 7, since no current flows through this winding. Referring to Fig. 2, working fluxes are consequently established in all four quadrants of the machine. The working fluxes $\phi_1$ through the constant pole 1 and the adjacent shunt poles 2 and 4 are produced by the constant-field winding 6 with the assistance of the two shunt-field windings 8 and 9; while the working fluxes $\phi_2$ through the series pole 3 and the adjacent shunt poles 2 and 4 are produced by the shunt-field windings 8 and 9 alone. Therefore, it is clear that the character of the generator on open-circuit is that of a standard four-pole machine having four field poles successively alternating in polarity about a four-pole armature.

Upon connecting the generator with the welding circuit, current is supplied in increasing amount to such circuit. At the initial values of this increasing current (Fig. 2), the four working fluxes $\phi_1$ and $\phi_2$ are still produced, but the working fluxes $\phi_2$ are now produced by the shunt-field windings 8 and 9 in conjunction with the opposing action of the series-field winding 7, the magnetomotive forces of the shunt-field windings 8 and 9 being greater than the magnetomotive force of the series-field winding 7. Each of the four working fluxes $\phi_1$ and $\phi_2$ is nevertheless reducing in intensity as the current in the work circuit increases. The generator thus operates under these increasing initial load values in the same manner as on open-circuit, but with reducing terminal voltage.

As the current supplied to the welding circuit continues to increase, there occurs a moment when the magnetomotive force of the series-field winding 7 equals the magnetomotive forces of the shunt-field windings 8 and 9. At this instant (Fig. 3), the working fluxes $\phi_2$ are both zero. No flux whatever is now produced through the series pole 3, the only field fluxes being the two working fluxes $\phi_1$ produced in the same manner as before, but having a value less than at any previous instant. The generator thus operates under the momentary conditions of Fig. 3 with substantially only half of the machine utilized for generating purposes, the terminal voltage being obviously less than at any previous instant.

It should be noted that the momentary conditions of Fig. 3 are not at all dependent on the shunt-field windings 8 and 9 having equal magnetomotive forces. If these magnetically parallel magnetomotive forces are unequal, this simply means that one of the working fluxes $\phi_2$ will cease to exist first, the momentary conditions of Fig. 3 occurring at the later instant when the other of the working fluxes $\phi_2$ also ceases to exist. Although shunt field windings 8 and 9 of equal magnetomotive forces are preferred, this is not at all essential to the invention.

It is now apparent that Fig. 2 can be regarded as being illustrative of conditions under all loads less than the load causing either of the working fluxes $\phi_2$ to become zero; while Fig. 4 can be regarded as being illustrative of conditions under all loads greater than the load corresponding to the momentary conditions of Fig. 3.

Referring to Fig. 4, when the current supplied to the welding circuit attains a value causing the magnetomotive force of the series-field winding 7 to be greater than the magnetomotive forces of the shunt-field windings 8 and 9, fluxes $\phi_3$ are produced in the series pole 3, but in a reversed direction. Because of this reversed polarity of the series pole 3, the fluxes $\phi_3$ are by necessity produced through the two halves of the armature by the combined action of the series-field winding 7 and the constant-field winding 6, their magnetic paths including both the series pole 3 and the constant pole 1. Since the armature is a four-pole armature, the fluxes $\phi_3$ produce no voltage at the generator terminals, the electromotive forces generated by each counteracting each other in the armature winding. The fluxes $\phi_3$ are thus non-working fluxes; the only working fluxes being the fluxes $\phi_1$ produced as before by the combined action of the constant-field winding 6 and the two shunt-field windings 8 and 9.

Still referring to Fig. 4, the magnetomotive force of the series-field winding 7 is in part used at any instant to counterbalance the magnetomotive forces of the shunt-field windings 8 and 9, which makes the transfer of any flux between the series pole 3 and either of the shunt poles 2 and 4 impossible. The shunt-field windings 8 and 9 thus function in effect to oppose the production of the non-working fluxes $\phi_3$ in the series pole 3. This opposition is negligible on short-circuit, but very great at the incipient stage of the non-working fluxes $\phi_3$, which thus build up from zero under the momentary conditions of Fig. 3 to a maximum on short-circuit. Therefore, since the production of the non-working fluxes $\phi_3$ is in part derived at any instant from the magnetomotive force of the constant-field winding 6, it is clear that this winding itself necessarily functions in Fig. 4 to diminish the working fluxes $\phi_1$ in intensity with increase of current supplied to the welding circuit (especially if the constant pole 1 is designed for magnetic saturation), this effect of the constant-field winding 6 on the working fluxes $\phi_1$ being obviously one that increases from zero under the momentary conditions of Fig. 3.

The generator thus operates in Fig. 4 in the same manner as in Fig. 3, but with reducing terminal voltage with increasing load. As more and more current is supplied from the generator, the non-working fluxes $\phi_3$ increase more and more, which causes the working fluxes $\phi_1$ to finally attain a value on short-circuit merely in excess of zero to enable them to produce the slight voltage required for maintaining short-circuit current flow. From the foregoing description it is apparent that the decrease in the working fluxes $\phi_1$ to this value is continuous from open-circuit. Since the decrease in the working fluxes $\phi_2$ to the value zero under the momentary conditions of Fig. 3 is also continuous, it is clear that a self-regulating drop in terminal voltage is continuously provided by the generator from open-circuit to short-circuit.

It should be noted that this terminal voltage variation is dependent on the use of a series-wound armature 5, each of the two parallel paths characterizing this type of armature winding operating at any instant under the influence of each of the fields produced through the armature, regardless of the number of armature poles. For this reason, the voltage produced at the machine terminals P and Q is equal at any instant to the algebraic sum of all electromotive forces generated in either of such armature paths. More specifically stated, additive voltages are produced by the four working fluxes $\phi_1$ and $\phi_2$ in each of the two parallel paths characterizing the series-wound armature 5, while opposing voltages of equal strength are produced by each of the two non-working fluxes $\phi_3$.

Because of the series-wound armature 5, of course, there can be no unbalancing of the load therein. Also, only two (a positive and a negative) of the four brushes shown on the commutator 12 need be employed, although better commutation results by the use of the four brushes.

By the use of long-shunt connections for the shunt-field windings 8 and 9, it has been found that appreciable reduction in the short-circuit current value is obtained.

In welding operations, the resistance of the welding circuit is susceptible to considerable sudden change, as when the welding electrode is short-circuited to the work. In the case of self-regulating machines, the reflected surges of current accompanying these resistance changes are apt to be particularly severe as a result of inductive action peculiar to the interlinking of their series field with other windings. This accounts for the practice of operating such machines in conjunction with one or another of various surge-reducing means, such as an external reactor inserted in the welding circuit. In accordance with the present invention, these surges are effectively minimized without recourse to any other means than that which is inherent in the operation peculiar to its generator construction, as will now be explained.

Referring to Figs. 2 to 4, the only fluxes which the series-field winding 7 may contribute to produce under load are the working fluxes $\phi_2$ of Fig. 2, which interlink with the shunt-field windings 8 and 9, and the non-working fluxes $\phi_3$ of Fig. 4, which interlink with the constant-field winding 6. Therefore, it is only under the initial load values of Fig. 2 that the series-field winding 7 is coupled magnetically with the shunt-field windings 8 and 9. In this connection it is important to note that the initial load conditions illustrated in Fig. 2 are merely transitory conditions established in the generator at the beginning of a welding operation. Consequently, the important fluxes to be considered, from the standpoint of any inductive effect of the series-field winding 7 on other windings, are the non-working fluxes $\phi_3$ of Fig. 4 which illustrates the conditions normally prevailing in the generator under actual welding.

Referring to Fig. 4, let the fluxes $\phi_3$ be assumed to suddenly change due to sudden change in the current through the series-field winding 7. Because the constant-field winding 6 at any instant contributes to producing the fluxes $\phi_3$, it is clear that the working fluxes $\phi_1$ must simultaneously experience corresponding sudden change. An increase in the fluxes $\phi_3$ necessarily results in a decrease in the fluxes $\phi_1$, while a decrease in the fluxes $\phi_3$ necessarily results in an increase in the fluxes $\phi_1$. In either case the total flux through the constant pole 1 will not change to any appreciable extent, especially if this pole is operated at magnetic saturation. Because of this tendency of constant total flux in the pole 1, inductive action of the series-field winding 7 on the constant-field winding 6 is practiclly impossible at any time, the working fluxes $\phi_1$ being substantially in no way susceptive to change beyond their normal change by any sudden change in the fluxes $\phi_3$.

Although the working fluxes $\phi_2$ of Fig. 2 interlink with the shunt-field windings 8 and 9, it should first be noted that the load values causing these fluxes to be established in the generator are comparatively small. No great change in the current through the series-field winding 7 can thus take place under the conditions of Fig. 2, from which it is apparent that there can be but little inductive action of the series-field winding 7 on the shunt-field windings 8 and 9 at any time. Moreover, the working fluxes $\phi_2$ are produced in a direction opposite to the magnetomotive force of the series-field winding 7, because of which the changes that may result in the generator from such inductive action are altogether negligible. Aside from these facts, it will be understood that the conditions of Fig. 2 are not for long present in the generator under actual welding, for which reason alone satisfactory operation can not to any great extent be affected by the interlinking of its working fluxes $\phi_2$ with the shunt-field windings 8 and 9.

Notwithstanding the simple construction characterizing the generator of the present invention, it is now clear that the usual current surges occurring in welding operations are effectively minimized as a result of its own peculiar operation; its transient characteristics, including time of recovery from such surges, being as a whole excellent.

The welding generator illustrated in Fig. 5 contains the same essential elements as described in connection with Fig. 1, but in addition includes preferred constructional features which for simplicity have not been shown in Fig. 1.

Referring to Fig. 5, for the purpose of varying the current output, the series-field winding 7 is carried by a specially constructed pole element 3a comprising an inner core 31 adapted for inward and outward movement through the outer yoke portion of the machine. As shown, the core 31 may be moved by a hand wheel 32 equipped with a screw 33 mounted in a bracket 34 fixed to the outer yoke portion of the machine and having its inner end attached to the outer portion of the core 31. Movement of the core 31 operates to vary the reluctance of the pole element 3a with a resulting variation in the flux capable of being produced through such pole. An inward movement of the core 31 decreases the reluctance and produces a decreased current output, while an outward movement of the core 31 increases the reluctance and produces an increased current output.

The welding generator of Fig. 5 also has a field magnet frame which includes the usual interpole members 35 disposed to align with the armature commutating zones. Carried by these interpole members are the usual series-excited windings 36, which are all shown connected in the conductor 18 leading from the positive brushes 13 and 15 to the series-field winding 7.

If desired, a rheostat 37 may be inserted in one of the conductors 20 included in the circuit of the shunt-field windings 8 and 9, for the purpose of varying the open-circuit voltage.

Welding operations are carried out with the current flowing in the arc either in a direction from the electrode or in a direction from the work, depending on the type of welding electrode employed. Therefore, for the convenience of the operator, a means is included in the welding equipment of Fig. 5 by which the polarity of the generator may be controlled.

The direction of current flow from the output terminals P and Q of the generator has been found to be positively controlled by the direction of current flow through the constant-field winding 6. In Fig. 5 a simple double-pole double-throw reversing switch 38 is therefore shown connected in the conductors 11 supplying the exciting current to the constant-field winding 6. The use of this switch positively reverses the magnetomotive forces M1 to M4 of all four windings 6 to 9 (as well as the magnetomotive forces of the interpole windings 36), the generator operating in exactly the same manner as heretofore described in connection with Figs. 2 to 4, except for reversed fluxes through the various poles (including the interpoles 35) and reversed polarities at the generator terminals P and Q. The position of the switch 38 shown in full lines causes the four brushes 13 to 16 to assume the polarities indicated with a resulting direction of current flow in the welding circuit shown by the arrows C; while the position of the switch 38 shown in dotted lines causes the four brushes 13 to 16 to assume polarities opposite to those indicated with a resulting direction of current flow in the welding circuit opposite to that shown by the arrows C. Obviously, this simple polarity reversing means adds but little to the cost of the equipment.

In the case of alternating-current motor-driven generators, it has also been found possible by the use of simple rectifying means to supply the required exciting current to the constant-field winding 6 from a tapped portion of the motor stator winding. Still referring to Fig. 5, the numeral 39 has reference to the motor stator winding, which is shown as a 3-phase winding connected by conductors 40 to the terminals 41 of an available 3-phase current source. A comparatively small portion 39a of one of the stator winding phases is connected by conductors 42 to the input of a small rectifier 43, the rectified current being supplied to the constant-field winding 6 through the aforedescribed conductors 11.

Because of the small current required to excite the constant-field winding 6, the unbalance of the motor caused by tapping into its stator winding does not exceed the usual unbalance of the line. If desired, however, all three phases of the stator winding 39 may be tapped to avoid any motor unbalance.

Various advantages result from the aforedescribed exciting means. In the first place, the manufacturing cost of the equipment is greatly reduced. Because of the small amount of exciting energy required, the cost of the rectifier 43 is very small as compared to that of the usual exciting generator, the need of a transformer being eliminated by the permitted tapping into the motor stator winding. In the second place, the use of the rectifier 43 positively excludes the possibility of the generator changing its polarity while in welding duty. The generator may thus be used in multiple with another machine without equalizing connections being required. Irrespective of the capacities of the two machines, they conjointly deliver the sum of their respective current output settings, no tendency of a reversal of either by the other being possible.

Fig. 6 illustrates how compound windings deriving their excitation from the armature may be used instead of the single separately-excited constant-field winding 6 of the aforedescribed field winding arrangement, where no outside source of electric power is available, as in the case of gasolene-engine-driven units. On the pole element 1 is now carried a series-field winding 51 and a shunt-field winding 52. As shown, the series-field winding 51 may be connected between the conductor 17 leading from the negative brushes and an outer conductor 53 leading to the output terminal P. The shunt-field winding 52 is shown connected by conductors 54 as a short shunt across the conductors 17 and 18 connecting the two pairs of brushes. As before, the shunt-field windings 8 and 9 are connected across both armature 5 and series-field winding 7, but one of the conductors 20 is now connected to the conductor 17 leading to the series-field winding 51. All other connections of Fig. 6 are the same as in Fig. 1.

The two windings 51 and 52 should be wound to assist one another in producing a total magnetomotive M11 of the same relative direction as already specified in connection with the single constant-field winding 6 of the aforedescribed field winding arrangement. The magnetomotive force of the series-field winding 51 is zero on open-circuit and maximum on short-circuit, while the magnetomotive force of the shunt-field winding 52 is maximum on open-circuit and substantially zero on short-circuit. Consequently, the total magnetomotive force MII of the two windings 51 and 52 is substantially constant from open-circuit to short-circuit, especially if the pole element 1 is designed for magnetic saturation. The two windings 51 and 52 thus function together in the same manner as the single constant-field winding 6 of the aforedescribed field winding arrangement, the operation of the generator as a whole being obviously the same as in Fig. 1.

As made clear by the curves E of Fig. 7, the external characteristics obtainable by the invention are of the preferred type characterized by continuous drooping from open-circuit to short-circuit. Because of this drooping the terminal voltage variation is particularly sharp over the lower full line portions of the curves E, these being their operating portions employed under actual welding. The external characteristics obtainable by the invention are thus of the type most suited for arc welding purposes, it being understood that there are as many curves E obtainable as there are different current settings of the machine.

What is claimed is:

1. A direct-current generator for arc welding comprising a four-pole series-wound armature, a field magnet frame having four pole elements circumferentially disposed about said armature, a constant-field winding carried by one pole element, a series-field winding carried by the oppositely disposed pole element, and two shunt-field windings respectively carried by the remaining two oppositely disposed pole elements, said shunt-field windings assisting the constant-field winding and opposing the series-field winding.

2. In an apparatus for arc welding, a direct-current generator comprising a four-pole series-wound armature equipped with a commutator provided with load brushes, a field magnet frame having four pole elements circumferentially disposed about said armature, a constant-field winding carried by one pole element, a series-field winding carried by the oppositely disposed pole element, and two shunt-field windings respectively carried by the remaining two oppositely disposed pole elements, said shunt-field windings assisting the constant-field winding and opposing the series-field winding; and means for reversing the polarity of said brushes comprising a reversing switch in the exciting circuit of said constant-field winding.

3. In a motor-driven generator unit for arc welding, a direct-current generator comprising a four-pole series-wound armature, a field magnet frame having four pole elements circumferentially disposed about said armature, a constant-field winding carried by one pole element, a series-field winding carried by the oppositely disposed pole element, and two shunt-field windings respectively carried by the remaining two oppositely disposed pole elements, said shunt-field windings assisting the constant-field winding and opposing the series-field winding; an alternating-current motor for driving said generator having a stator winding; and means for exciting said constant-field winding comprising a rectifier through which the exciting current to said constant-field winding is supplied from a tapped portion of said motor stator winding.

4. A direct-current generator for arc welding comprising a four-pole series-wound armature, a field magnet frame having four pole elements circumferentially disposed about said armature, a group of self-excited compound windings of substantially constant total magneto-motive force carried by one pole element, a series-field winding carried by the oppositely disposed pole element, and two shunt-field windings respectively carried by the remaining two oppositely disposed pole elements, said shunt-field windings assisting the group of self-excited compound windings and opposing the series-field winding.

5. A direct-current generator for arc welding comprising a four-pole series-wound armature, a field magnet frame having four pole elements circumferentially disposed about said armature, a constant-field winding carried by one pole element, a series-field winding carried by the oppositely disposed pole element, two shunt-field windings respectively carried by the remaining two oppositely disposed pole elements, said shunt-field windings assisting the constant-field winding and opposing the series-field winding, and means for varying the reluctance of the pole element carrying the series-field winding.

6. A direct-current generator for arc welding comprising a four-pole series-wound armature, a field magnet frame having four pole elements circumferentially disposed about said armature, a group of self-excited compound windings of substantially constant total magneto-motive force carried by one pole element, a series-field winding carried by the oppositely disposed pole element, two shunt-field windings respectively carried by the remaining two oppositely disposed pole elements, said shunt-field windings assisting the group of self-excited compound windings and opposing the series-field winding, and means for varying the reluctance of the pole element carrying the series-field winding.

ERNEST E. TISZA.
JOSEPH TYRNER.